United States Patent [19]
Masuda

[11] Patent Number: 5,434,674
[45] Date of Patent: Jul. 18, 1995

[54] DIGITAL FLUOROGRAPHIC IMAGE RECORDING APPARATUS USING A DIGITAL VIDEO TAPE RECORDER TO STORE DATA IN MULTIPLE FORMATS

[75] Inventor: Ikuji Masuda, Tochigi, Japan

[73] Assignee: Kabushiki Kaisha Toshiba, Kawasaki, Japan

[21] Appl. No.: 159,109

[22] Filed: Nov. 30, 1993

Related U.S. Application Data

[63] Continuation of Ser. No. 646,942, Jan. 30, 1991, abandoned.

[30] Foreign Application Priority Data

Jan. 31, 1990 [JP] Japan ................................. 2-18919

[51] Int. Cl.⁶ ............................................. H04N 5/76
[52] U.S. Cl. ................................. 358/335; 358/312; 360/33.1; 360/35.1
[58] Field of Search ............... 358/335, 312, 343, 311, 358/111, 517; 360/33.1, 35.1, 10.1, 19.1; H04N 5/76; 348/443, 390

[56] References Cited

U.S. PATENT DOCUMENTS

| | | | |
|---|---|---|---|
| 4,819,059 | 4/1989 | Page | 358/310 |
| 4,858,032 | 8/1989 | Okada et al. | 358/343 |
| 4,931,954 | 6/1990 | Honda et al. | 358/133 |
| 4,963,992 | 10/1990 | Doi et al. | 358/335 |
| 4,985,784 | 1/1991 | Tsuboi et al. | 358/335 |
| 5,018,027 | 5/1991 | Roggendorf | 358/312 |
| 5,056,524 | 10/1991 | Oe | 358/111 |
| 5,068,744 | 11/1991 | Ito | 358/310 |

*Primary Examiner*—Jeffery Brier
*Assistant Examiner*—Huy Nguyen
*Attorney, Agent, or Firm*—Finnegan, Henderson, Farabow, Garrett & Dunner

[57] ABSTRACT

DF image data of a first format; representing an image of a target object or patient and consisting of a plurality of frames is input to a data compressor and a data file. The DF image data of the first format is converted into DF image data of the second format by the data compressor, a pixel bit converter, and an encoder. The DF image signal of the second format is recorded on a tape in a digital VCR through a switch. The DF image data of the first format from the data file is converted into DF display image data of a standard format by a conversion table. This DF display image data is recorded on the tape through the switch. When the digital VCR is then set in a variable speed reproduction or frame feeding mode, the DF display image data is displayed on a TV monitor, thereby finding desired DF image data.

7 Claims, 6 Drawing Sheets

|     |     | 31a ↓ |     |     |     |     |     |
|-----|-----|------|------|------|------|------|------|
| 48a |     | SA1  | SA2  |      |      |      |      |
| 48b |     | SB1  | SB2  |      |      |      |      |
| 48c |     | SC1  | SC2  |      |      |      |      |
| 48d |     | SD1  | SD2  |      |      |      |      |
| 48e |     | SE1  | SE2  |      |      |      |      |
| 32  | D1  | S1   | D2   | S2   | D3   | S3   |      |
| 33  | f0  | f1   | f0   | f1   | f0   | f1   |      |

F I G. 10

|     | 31a ↓ |     |     |     |     |     |
|-----|------|------|------|------|------|------|
| 48a | SA1  | SA2  |      |      |      |      |
| 48b | SB1  | SB2  |      |      |      |      |
| 48c | SC1  | SC2  |      |      |      |      |
| 48d | SD1  | SD2  |      |      |      |      |
| 48e | SE1  | SE2  |      |      |      |      |
| 32  | D1   | S1   | D2   | S2   | D3   | S3   |
| 33  | f0   | f1   | f0   | f1   | f0   | f1   |

F I G. 11

DIGITAL FLUOROGRAPHIC IMAGE RECORDING APPARATUS USING A DIGITAL VIDEO TAPE RECORDER TO STORE DATA IN MULTIPLE FORMATS

This application is a continuation of application Ser. No. 07/646,942, filed Jan. 30, 1991, now abandoned.

BACKGROUND OF THE INVENTION

1. Field of the Invention

The present invention relates to an image recording apparatus for recording image data obtained by a digital fluorographic apparatus or the like.

2. Description of the Related Art

A digital fluorographic apparatus (to be referred to as a DF apparatus hereinafter) involves applying a digital image processing technique to an X-ray diagnosis apparatus. This digital image processing technique converts an output video signal from a TV camera into a digital signal and, if necessary, performs subtraction processing of the digital signal in a real-time manner.

A technique called a digital subtraction angiography (DSA) for injecting a contrast medium into the jugular of a patient and obtaining an angiographic image of a blood vessel is known. More specifically, according to DSA, a contrast medium is injected into the jugular of a patient, and images obtained before and after the contrast medium reaches a blood vessel in a target portion of the patient are subjected to a subtraction to erase an image except for the blood vessel, thereby obtaining a blood vessel image.

It has been attempted to record image data of a blood vessel image or the like processed by the DF apparatus as a real-time permanent file by a recording apparatus such as a digital video tape recorder (digital VTR) or a digital video cassette recorder (digital VCR).

As illustrated by FIG. 1, image data is to be recorded in a VTR, image data from the DF apparatus is transferred to a digital VCR in a real-time manner. The DF image data output from the DF apparatus is gradation-converted using an appropriate display window, thereby obtaining one-frame image data S (512 pixels×512 pixels×8 bits=2,097,152 bits) of a standard format shown in FIG. 1. A recording area M2 for recording one-frame image data in a digital VCR consists of 512 pixels×768 pixels×8 bits=3,145,728 bits. The total number of bits of the recording area M2 is larger than the total number of bits of the image data S, so that the image data S can be easily recorded on a digital VCR tape 31.

The following problem is presented as illustrated by FIGS. 1 and 2 when DF image data FD output from the DF apparatus is recorded in a digital VCR without performing gradation conversion. One-frame DF image data FD is 12-bit data, yet the recording area M2 of the digital VCR stores 8-bit data. The number of bits of thus, the DF image data FD is not equal to that of the recording area M2. The DF image data FD consists of 512 pixels×512 pixels×12 bits=3,145,728 bits, which number of bits is equal to the total number of bits of the recording area M2 of the digital VCR.

However, when additional information such as a vertical sync signal and a burst signal; is added when the DF image data FD is recorded in the digital VCR, the number of bits required for such additional information is 0.5 to 1. For this reason, 12.5- to 13-bit data is necessary to record the DF image data FD. The total number of bits of the DF image data DF thus exceeds the total number of bits of the recording area M2 of the digital VCR. That is, DF image data DF cannot be recorded in the existing digital VCRs.

The following processing is conventionally proposed to solve the above problems. That is, significant image data from a circle SL is extracted from one-frame DF image data FD (512 pixels×512 pixels×12 bits) by using a data compressor 12 shown in FIG. 2. Portions except for the circle SL corresponds to $\frac{3}{4}$ of one frame are eliminated, and the DF image data FD is compressed. The depth (gradation), i.e., 12 bits, of the compressed image data is segmented into two portions, i.e., 6 bits×2 by a pixel bit converter 12a. All the bits of each compressed half, i.e., 512 pixels×512 pixels×$\frac{3}{4}$×6 bits, are converted from data of 6 bits×7 pixels to data of 7 bits×6 pixels in units of 6 bits×7 pixels. The bit-converted image data is converted into a predetermined standard by an encoder. The converted image data is image data having a special format, and this DF image data D can then be directly recorded in the digital VCR.

Since the format of the DF image data D recorded in the digital VCR has this special format, variable speed reproduction and frame feeding which are provided in the digital VCR as standard functions cannot be performed, and DF image data cannot be easily searched. Therefore, it is inconvenient for a doctor to observe and diagnose an image.

SUMMARY OF THE INVENTION

It is an object of the present invention to provide an image recording apparatus capable of facilitating a search operation of digital fluorographic image data etc., by a digital VCR itself, there by shortening the search time of an image file accordingly and reducing the labor of an operator.

According to the present invention, there is provided an image recording apparatus connected to an image signal source means for providing an image signal of a first format, and a video cassette recorder for recording an image signal of the first format and an image signal of a second format, comprising.: means for converting the image signal output from said image signal source means into an image signal of the second format; and means for supplying the image signal of the first format output from the image signal source means and the image signal of the second format output from said converting means to said video cassette recorder such that the image signal of the first format is recorded in association with the image signal of the second format.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 10 is a data format in which audio data necessary for image data is recorded at a tape position not corresponding to the image data; and FIG. 11 is a data format in which audio data necessary for image data is recorded at a tape position corresponding to the image data.

DETAILED DESCRIPTION OF THE PREFERRED EMBODIMENT

Figure 1:
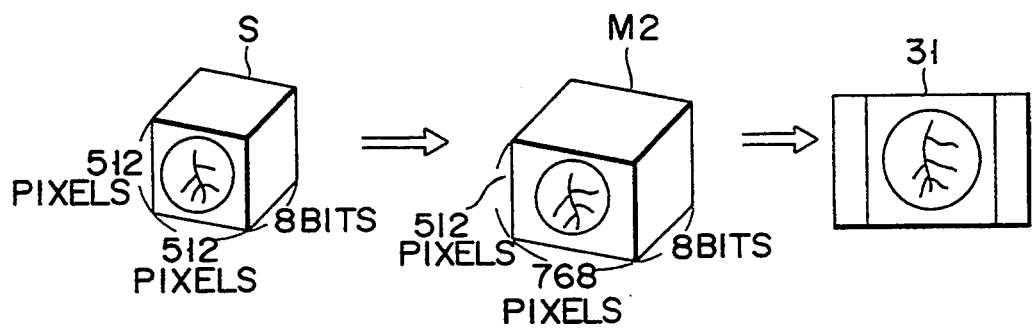
FIG. 1 is a diagram illustrating an operation for recording DF display image data in a digital VCR.
Figure 2:
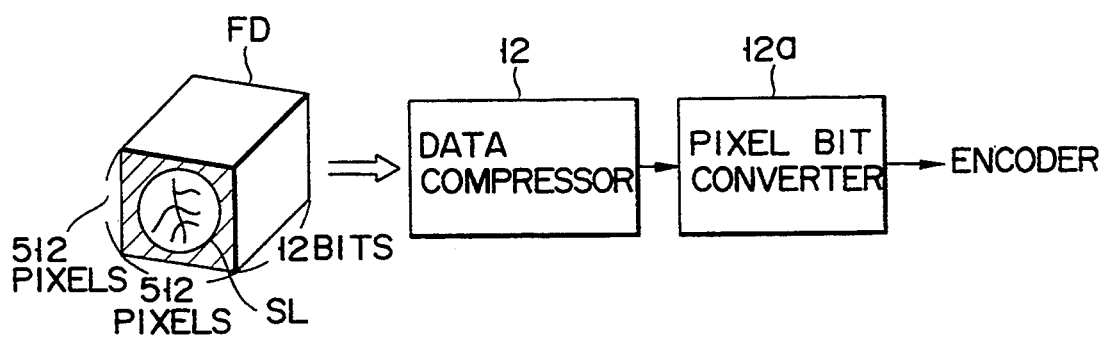
FIG. 2 is a diagram illustrating an operation for converting DF image data into image data of a second format and recording the image data of the second format in the digital VCR.
Figure 3:
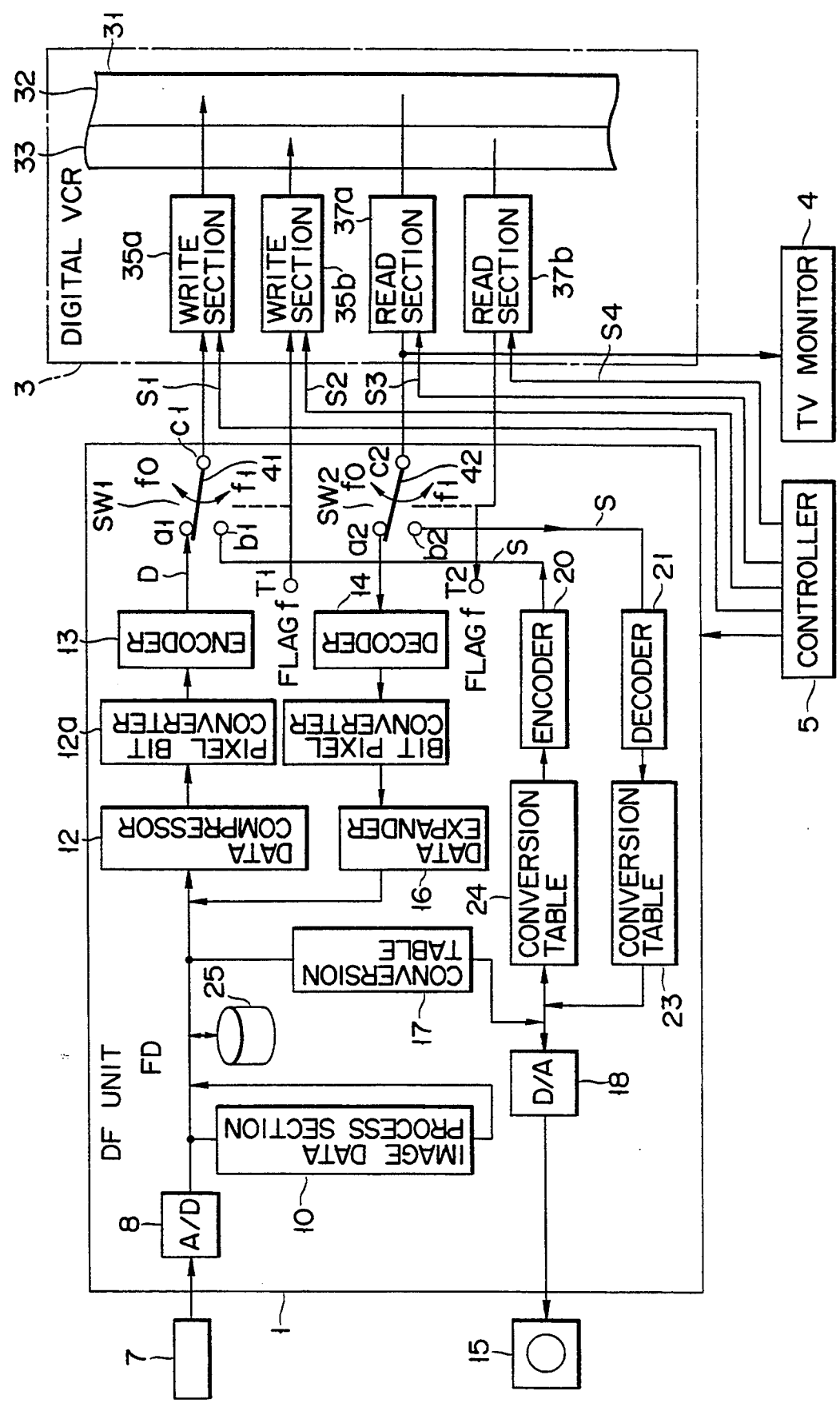
FIG. 3 is a schematic block diagram of an image recording apparatus according to the first embodiment of the present invention.
Figure 4:
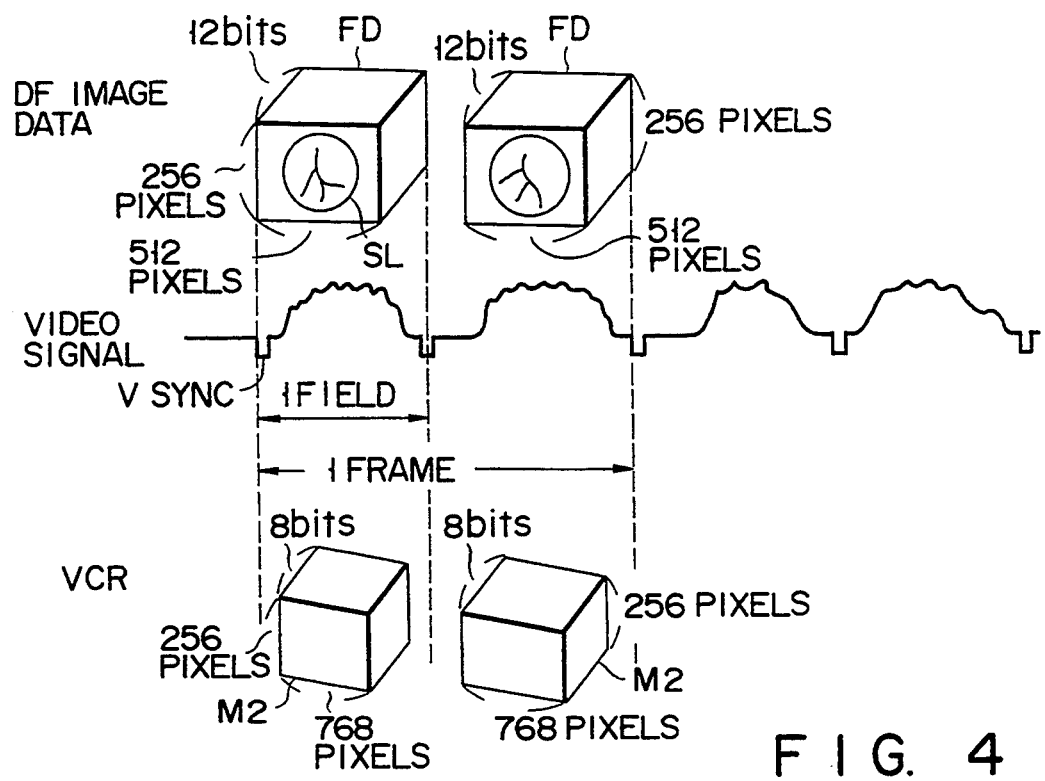
FIG. 4 is a diagram showing a relationship between one-field DF image data and a one-field digital VCR.

FIG. 3 is a schematic block diagram showing an image recording apparatus according to the first embodiment of the present invention. FIG. 4 is a view showing a relationship between one-field DF image data and a one-field digital VCR.

Referring to FIG. 3, the image recording apparatus comprises a digital fluorographic (DF) apparatus 1, a digital VCR 3 connected to the output terminal of the DF apparatus 1, a TV monitor 4 connected to the input terminal of a read section 37a in the digital VCR 3, and a controller 5 for controlling the DF apparatus 1 and the digital VCR 3.

The DF apparatus 1 and, more specifically, the circuit arrangement used for recording image data in the digital VCR 3 are as follows.

A TV camera 7 takes images of, for example, a patient in units of diagnosis portions, each for a predetermined period of time to obtain a video signal including that includes a vertical sync signal V for each frame (e.g., one frame consists of 1/30 seconds) consisting of two fields, as shown in FIG. 4. The output terminal of the TV camera 7 is connected to an A/D (analog/digital converter) 8. The A/D 8 converts the video signal of each frame output from the TV camera 7 into a digital signal. The output terminal of the A/D 8 is connected to an image data process section 10, a data compressor 12, a conversion table 17, and a data file 25.

The image data process section 10 performs image processing, such as subtraction processing and addition processing of the digital signal output from the A/D 8 to obtain FD image data FD of the first format. As shown in FIG. 4, the DF image data DF consists of 512 pixels×512 pixels×12 bits per frame, as shown in FIG. 4 or of 256 pixels×512 pixels×12 bits per field. A recording area M2 of the digital VCR consists of 256 pixels×768 pixels×8 bits per field.

The output terminal of the image data process section 10 is connected to the data compressor 12, the data file 25, and the conversion table 17. DF image data FD of each diagnosis portion from the image data process section 10 is simultaneously input to the data compressor 12 and the data file 25.

As shown in FIG. 4, the data compressor 12 extracts necessary image data from one-field DF image data FD (256 pixels×512 pixels×12 bits), that is, extracts image data of a circle SL to omit unnecessary image data except for the circle SL, thereby obtaining compressed image data. Each compressed image data is, e.g., ¾ of one-field DF image data FD (256 pixels×516 pixels×12 bits), i.e., 256 pixels×512 pixels×¾×12 bits. The output terminal of the data compressor 12 is connected to a pixel bit converter 12a.

Figure 5B:
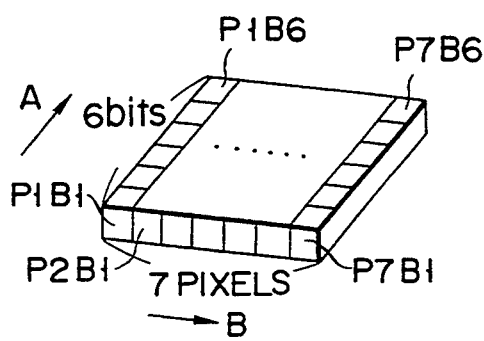
FIGS. 5A to 5C are diagrams for explaining a pixel bit converter.
Figure 5C:
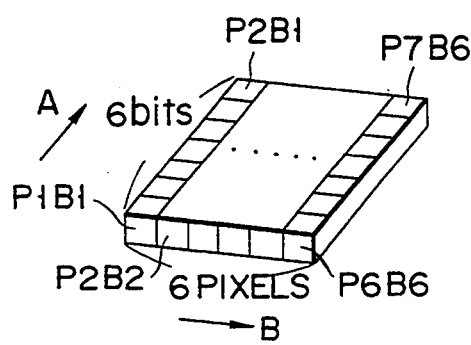
Figure 5A:
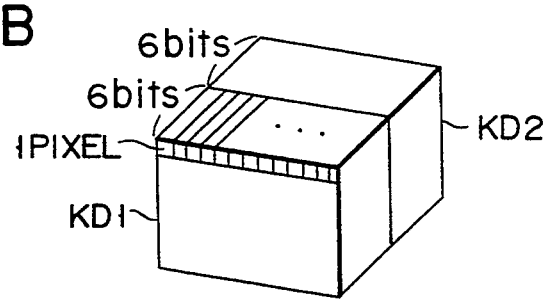

FIGS. 5A to 5C are views for explaining operation of the pixel bit converter 12a. As shown in FIG. 5A, the pixel bit converter 12a divides one-field compressed image data, i.e., 256 pixels×512 pixels×¾×12 bits, into divided image data KD1 and KD2 each consisting of 256 pixels×512 pixels×¾×6 bits. The pixel bit converter 12a converts the one-field divided image data KD1 and KD2 in units of, e.g., 7 pixels×6 bits from data consisting of 7 pixels×6 bits into data each consisting of 6 pixels×7 bits. More specifically, as shown in FIG. 5B, image data each consisting of 7 pixels×6 bits are starting from the image data $P_1B_1$ of the first pixel and the first bit to the image data $P_1B_6$ of the first pixel and the sixth bit along a bit direction A. Image data extracted in the bit direction A is performed along a pixel direction B, and finally image data $P_7B_6$ of the seventh pixel and the sixth pixel is extracted. The image data sequentially extracted in the bit and pixel directions are rearranged every seven bits, as shown in FIG. 5C, thereby converting the bit data into data each consisting of 6 pixels×7 bits. The bit-converted image data of the first pixel are $P_1B_1$ to $P_2B_1$, and the image data of the sixth pixel are $P_6B_6$ to $P_7B_6$.

The pixel bit converter 12a thus converts each divided image data (256 pixels×512 pixels×¾×6 bits=98,304×6 bits) into data of 256 pixels×658 pixels×7 bits=84,260 pixels×7 bits. Six bits in the gradation direction are converted into 7 bits because the gradation direction must be efficiently utilized. The recording area of the digital VTR consists of 8 bits in the gradation direction. The additional information is added by about 0.5 to 1 bit in the gradation direction to the 7 gradation bits of the bit-converted image data by an encoder 13 (to be described below). The output terminal of the pixel bit converter 12a is connected to the encoder 13.

The encoder 13 converts the bit-converted image data from the pixel bit converter 12a into data complying with conventional video recording standards (e.g., RS-180A standards). According to these standards, additional information of about 0.5 to 1 bit such as a horizontal sync signal and a burst signal is added to the bit-converted image data. The DF image data FD input to the data compressor 12 is thus converted into DF image data D of the second format or "special format" by using the data compressor 12, the pixel bit converter 12a, and the encoder 13. The output terminal of encoder 13 is connected to a terminal a1 of a switch SW1.

Figure 6:
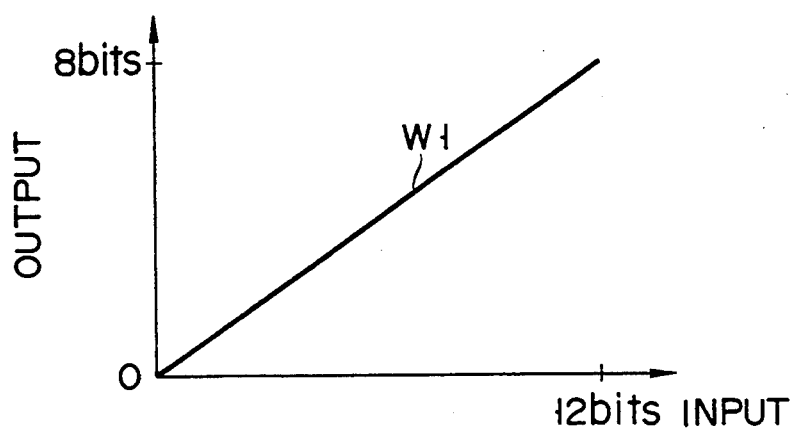
FIG. 6 is a graph for explaining a window of a conversion table 17.

The conversion table 17 converts, e.g., 12-bit gradation data to 8-bit gradation data by using an appropriate display window as shown in FIG. 6, and is used to generate DF display image data S of a standard format.

The output terminal of the conversion table 17 is connected to a D/A (digital/analog converter) 18 and a conversion table 24.

Figure 7:
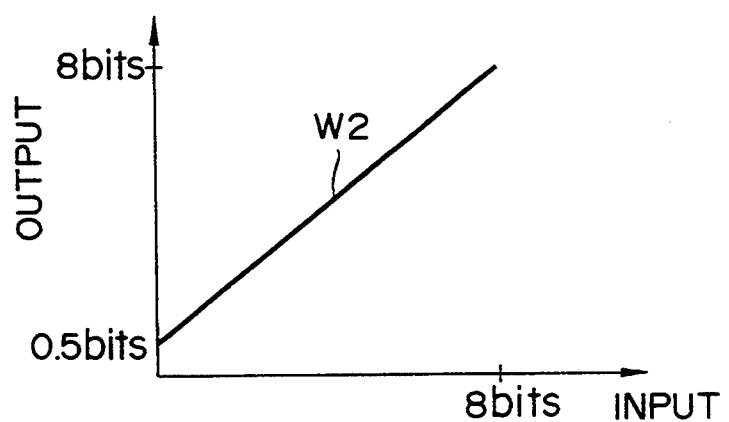
FIG. 7 is a graph for explaining a window of a conversion table 24.

The D/A 18 converts the DF display image data S as a digital signal output from the conversion table 17 into the DF display image data S as an analog signal. The output terminal of the D/A 18 is connected to a TV monitor 15. The TV monitor 15 displays the DF display image data S as the analog signal output from the D/A 18. The conversion table 24 converts the number of gradation bits of the DF display image data S from 0 to 8 bits to 0.5 to 8 bits by using a display window W2 shown in FIG. 7. An encoder 20 converts the DF display image data S output from the conversion table 17 into data complying with the same standards as those of the encoder 13. The output terminal of the encoder 20 is connected to a terminal b1 of the switch SW1.

The switch SW1 has terminals a1 and b1, common terminal c1, and a switching member 41 mounted at one end of the common terminal c1. The switch SW1 connects the other end of the switching member 41 to the terminal a1 or b1 in response to an image flag f0 or f1 received from a flag terminal T1.

A switch SW2 has terminals a2 and b2, a common terminal c2, and a switching member 42 mounted at one end of the common terminal C2. The switch SW2 connects the terminal a2 or b2 to the other end of the switching member 42 in response to the image flag f0 or f1 received by a flag terminal T2. In this embodiment, the other terminal of each of the switching members 41 and 42 is connected to a corresponding one of the terminals a1 and a2 in response to the image flag f0 and to a corresponding one of the terminals b1 and b2 in response to the image flag f1. The switches SW1 and SW2 alternately select the DF image data D of a plurality of frames in units of diagnosis portions and the DF display image data S of the plurality of frames corresponding in units of diagnosis portions.

A circuit arrangement used for reproducing image data from the digital VCR 3 will be described below.

The terminal a2 of the switch SW2 is connected to a decoder 14. The decoder 14 omits the additional information of about 0.5 to 1 bit from the DF image data D of an image track 32 on a tape 31 through the switch SW2. The output terminal of the decoder 14 is connected to a pixel bit reconverter 16a.

The bit pixel converter 16a recovers the DF image data D (84,260 pixels×7 bits) from the decoder 14 into data of 98,304×6 bits, thereby obtaining each compressed image data. The output terminal of the bit pixel converter 16a is connected to a data expander 16.

The data expander 16 adds the DF image data near the circle SL to each compressed image data from the pixel bit reconverter 16a to obtain the DF image data FD.

The output terminal of the data expander 16 is connected to the data file 25. The data file 25 stores the DF image data FD from the data expander 16.

The terminal b2 of the switch SW2 is connected to a decoder 21. The decoder 21 omits the additional information of about 0.1 to 1 bit from the DF display data S of the image track 32 on the tape 31 through the terminal b2 of the switch SW2. The output terminal of the decoder 21 is connected to a conversion table 23. The conversion table 23 converts the DF display image data of 0.5 to 8 bits into the DF display image data of 0 to 8 bits in a manner opposite to that of the conversion table 24. The output terminal of the conversion table 23 is connected to the D/A 18.

The TV monitor 15 displays the DF display data S as the analog signal from the D/A 18.

The digital VCR 3 is arranged as follows. The digital VCR 3 has a tape 31 for recording the DF image data D and the DF display image data S. This tape 31 has the image track 32 for recording the DF image data D and the DF display image data S, and a user track 33 for recording the image flags f0 and f1 for distinguishing the DF image data D from the DF display image data S.

The terminal c1 of the switch SW1 is connected to a write section 35a. The write section 35a alternately writes, on the image track 32, the DF image data D received from the encoder 13 through the terminal a1 of the switch SW1 and the DF display image data S received from the encoder 20 through the terminal b1 of the switch SW1 on the basis of a write command s1 (to be described later).

The flag terminal T1 is connected to a write section 35b. The write section 35b alternately writes the image flags f0 and f1 from the flag terminal T1 in correspondence with the DF image data D and the DF display image data S on the user track 33 in accordance with a write command s2 (to be described later).

The terminal c2 of the switch SW2 is connected to the read section 37a. On the basis of a read command s3, the read section 37a alternately reads the DF image data D and the DF display image data S which are recorded on the image track 32. The read section 37a outputs the DF image data D to the decoder 14 through the terminal a2 or the DF display data S to the decoder 21 through the terminal b2.

The flag terminal T2 is connected to a read section 37b. The read section 37b reads the image flags f0 and f1 from the user track 33 on the basis of a read command s4 and outputs them to the flag terminal T2.

The controller 5 outputs the write commands s1 and s2 to the write sections 35a and 35b, and the read commands s3 and s4 to the read sections 37a and 37b, and controls switching of the switches SW1 and SW2 in response to the flags f0 and f1. The output terminal of the read section 37a is connected to the TV monitor 4.

The TV monitor 4 displays only the DF image data D on the basis of the DF image data output from the read section 37a and the DF display image data S.

An operation of this embodiment having the above arrangement will be described with reference to the accompanying drawings.

An operation for recording image data in the digital VCR 3 will be described below. When a patient (not shown) is imaged by the TV camera 7 in units of diagnosis portions each for a predetermined period of time, video signals of the plurality of frames in each diagnosis portion are received by the A/D 8. The video signals from the A/D 8 are converted into digital signals, thereby obtaining the DF image data FD. The DF image data FD from the A/D 8 is also subjected to subtraction processing in the image data process section 10.

The DF image data FD of the plurality of frames in units of diagnosis portions output from the image data process section 10 are supplied to the data compressor 12 and the data file 25. Only a data portion corresponding to the circle SL is extracted from the DF image data FD of the plurality of images in units of diagnosis portions received by the data compressor 12, thereby performing data compression. The compressed image data of each field is divided from 12-bit data into two 6-bit data by the pixel bit converter 12a. The divided image data is converted from data of 7 pixels×6 bits into data of 6 pixels×7 bits in units of 7 pixels×6 bits. The encoder 13 adds a horizontal sync signal and a burst signal, which constitute about 0.5 to 1 bit, to the bit-converted DF image data, thereby obtaining the DF image data D of the second format.

Figure 8:
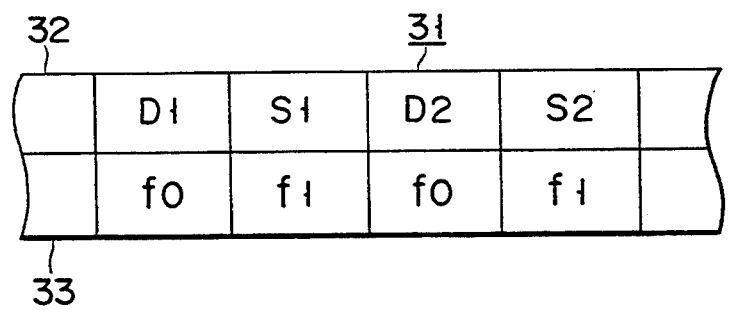
FIG. 8 is a table showing a recording format of DF image data and DF display image data on a tape.

When the write command s1 is input from the controller 5 to the write section 35a, and the switching member 41 of the switch SW1 is switched to the terminal a1 in response to the image flag f0, DF image data D1 of the plurality of frames of a given diagnosis portion within the predetermined period of time is recorded in the image track 32 on the tape 31 in the digital VCR 3 by the write section 35a through the switch SW1. At the same time, the write command s2 is input from the controller 5 to the write section 35b and the image flag f0 is input from the flag terminal T1 to the write section 35b. As shown in FIG. 8, the image flag f0 is recorded on tape 31; and on the user track 33 is in correspondence with the DF image data D1 by the write section 35b simultaneously with recording of the DF image data D1 on the image track 32.

When the DF image data FD from the data file 25 is converted from the 12-bit gradation data into 8-bit gradation data by an appropriate window stored in the conversion table 17 shown in FIG. 6, the DF display image data S of the standard format is obtained. DF display image data S1 of the plurality of frames corresponding to the given diagnosis portion within the predetermined period of time is converted into data of a predetermined standard by the encoder 20. When a command is supplied from the controller 5 to the switch SW1 in response to the image flag f1, the switching member 41 of the switch SW1 is switched to the terminal b1, and the write command s1 is input from the controller 5 to the write section 35a. The DF display image data s1 of the plurality of frames output from the encoder 20 is recorded on the image track 32 on the tape 31 in the digital VCR 3, i.e., on the right side of the DF image data D1, by the write section 35a through the switch SW1, as shown in FIG. 8.

At the same time, the image flag f1 is recorded in the user track 33 by the write section 35b in correspondence with the DF display image data S1.

When the switch SW1 is operated as described above, DF image data D2 of the plurality of the frames of the next diagnosis portion and the DF display data S2 of the plurality of frames corresponding to this diagnosis portion are recorded in the image track 32 on the tape 31, as shown in FIG. 8. The image flags f0 and f1 are sequentially recorded in the user track 33 in correspondence with the DF image data and the DF display image data.

By way of example, variable speed reproduction or frame feeding in the image reproduction mode will next be described below. When a read command s4 is input from the controller 5 to the read section 37b, an image flag is read from the user track 33 on the tape 31 by the read section 37b. If this image flag f is f1, the switching member 42 of the switch SW2 is switched to the terminal b2 by the controller 5.

The DF display image data S1 of the plurality of frames of the given diagnosis portion is read from the image track 32 by the read section 37a, and the DF display image data S of the standard format is obtained from the decoder 21 through the terminal b2. The DF display image data S is converted into analog signals by the D/A 18, and the analog signals are displayed on the TV monitor 15. In this case, the DF display data S can be displayed by the digital VCR 3 itself.

When a desired file is to be loaded in the data file 25 in the DF apparatus 1, variable speed reproduction or frame feeding is performed to observe the DF display image data S on the TV monitors 4 and 15. For example, when the DF display image data S1 of the desired DF display image data is displayed, the image flag f0 is automatically detected by the read section 37b, and the terminal a2 of the switch SW2 is selected. Since the DF apparatus 1 is switched to the DF image data mode, the DF image data D1 corresponding to the DF display image data S1 is read by the read section 37a. The DF image data D1 serves as the DF image data FD through the pixel bit reconverter 16a and the data expander 16, and the DF image data FD is stored in the data file 25.

According to this embodiment, after the DF image data of the second format is recorded in the digital VCR 3, the DF display image data of the standard format is automatically recorded in the digital VCR 3. When variable speed reproduction or frame feeding is performed in the playback mode, the DF display image data S of the standard format recorded in the digital VCR 3 can be easily observed. The DF image data D can be easily searched by the digital VCR 3 itself. The search time of the image file can be shortened, and the load on the operator can be reduced.

The present invention is not limited to the particular embodiment described above. For example, after the DF display image data S of the standard format is recorded in the digital VCR 3, the DF image data D of the second format may be automatically recorded in the digital VTR 3. Although the image data of one frame is formed of 512 pixels×512 pixels×12 bits in the above embodiment, it is possible to use image data of another format. For example, if the image data is formed of 1024 pixels×1024 pixels×12 bits or 256 pixels×512 pixels×12 bits, the number of division by the pixel bit converter 12a must be changed accordingly. Further, the TV camera 7 may be replaced by an analog image signal source, such as an analog VCR and a video disk device.

Figure 9:
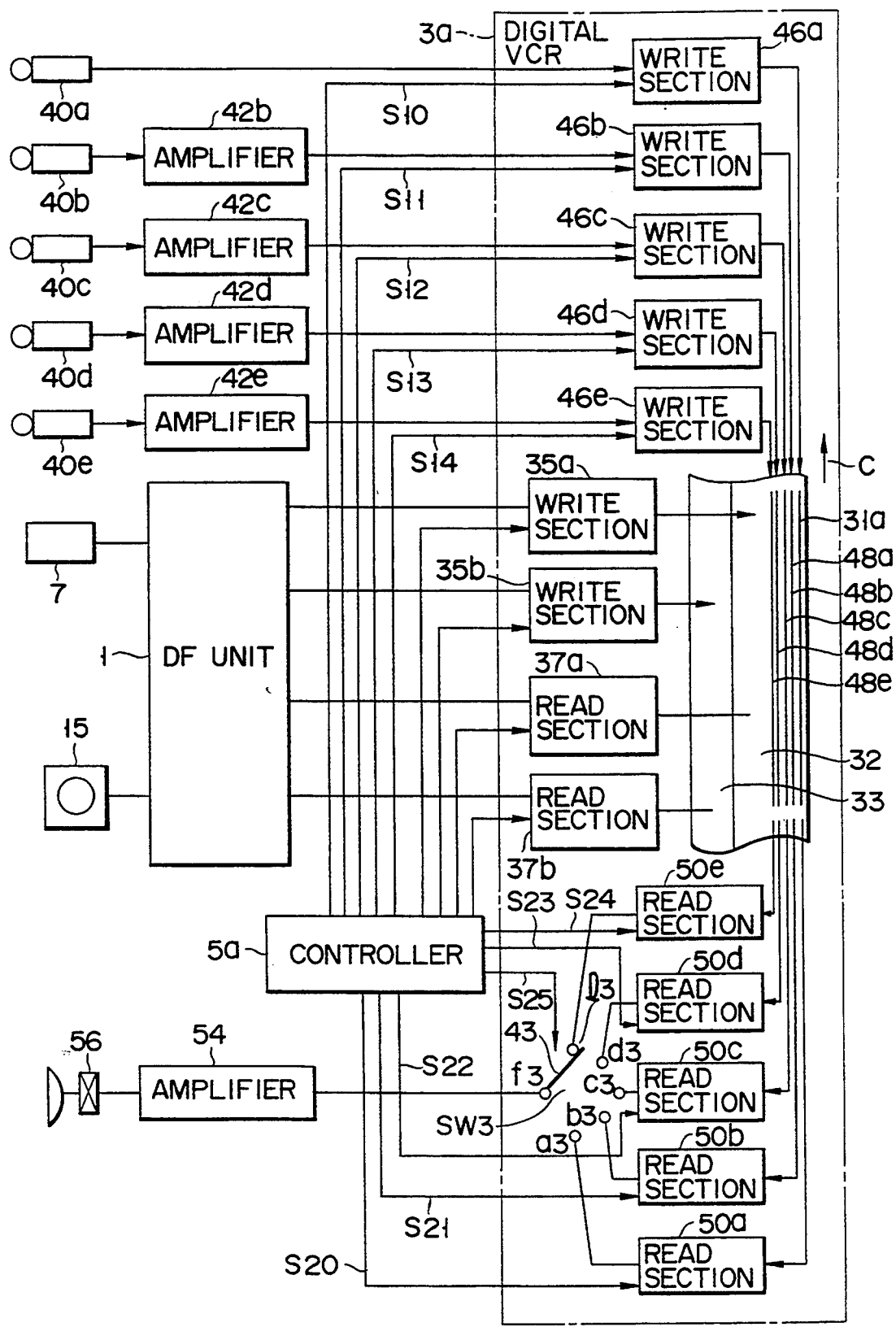
FIG. 9 is a block diagram for explaining an operation of recording image data and audio data in a digital VCR.

FIG. 9 is a block diagram of the second embodiment according to the present invention. The second embodiment is arranged such that an apparatus for recording audio data in a digital VCR 3a is added to the apparatus of the first embodiment. The second embodiment is arranged as follows.

Microphones 40a to 40e input diagnosis information suitable for each diagnosis portion of the patient by means of voices of an operator, and the voice inputs are converted into electrical signals to obtain audio data. The microphone 40a inputs Japanese operation information of a doctor or the like. The microphone 40b inputs Japanese case information of the respective narrow, abdomen and chest portions suitable for the DF image data of the respective diagnosis portions of the patient. The microphone 40c inputs English case information of each diagnosis portion. The microphone 40d inputs German case information of each diagnosis portion. The microphone 40e inputs French case information of each diagnosis portion. The output terminals of the four channel microphones 40b to 40e are connected to amplifiers 42b to 42e. The output terminal of the microphone 40a is connected to the digital VCR 3a.

The output terminal of the microphone 40a is not connected to an amplifier because the digital VCR 3a incorporates an amplifier (not shown).

The amplifiers 42b to 42e amplify audio data from the microphones 40 to levels enough to record the audio data on a tape 31a in the digital VCR 3a. The output terminals of the amplifiers 42b to 42e are connected to the digital VCR 3a.

The digital VCR 3a includes write sections 46a to 46e, read sections 50a to 50e, and a switch SW3 in addition to the arrangement of the first embodiment described above.

The write sections 46a to 46e write audio data from the microphone 40a and audio data from the amplifiers 42b to 42e in audio tracks 48a to 48e arranged on the right portion of the tape 31a in accordance with write commands s10 to s14 from a controller 5a.

The read sections 50a to 50e read the corresponding audio data from the audio tracks 48a to 48e of the tape 31a in accordance with read commands s20 to s24 from the controller 5a. The output terminals of the read sections 50a to 50e are connected to terminals a3 to e3 of the switch SW3.

The switch SW3 connects its switching member 43 to any one of the terminals a3 to e3 in accordance with a switching instruction s25 from the controller 5a. A terminal f3 of the switch SW3 is connected to an amplifier 54.

The amplifier 54 amplifies the selected audio signal to a level enough to drive a loudspeaker 56. The output terminal of the amplifier 54 is connected to the loudspeaker 56.

The loudspeaker 56 outputs the audio signal from the amplifier 54 as a sound.

An operation of the second embodiment having the above arrangement will be described below. As described in the first embodiment, the DF image data D and the DF display image data S are already recorded in a track 32 of the tape 31a. At the same time, image flags f0 and f1 are already recorded in a user track 33.

An operation for recording audio data on the tape 31a will be described below. An operation for recording case information on the tape 31a will be exemplified. An operator inputs Japanese case data SB1 and SB2 of the narrow and abdomen portions suitable for DF image data in units of diagnosis portions of a patient by means of voices input with the microphone 40b. The operator inputs English case data SC1 and SC2 of each diagnosis portion. The operator inputs German case data SD1 and SD2 of each diagnosis portion, and the operator inputs French case data SE1 and SE2 of each diagnosis portion. Audio data of the above languages from the microphones 40b to 40e are respectively amplified by the amplifiers 42b to 42e, and the amplified audio data are written in the audio tracks 48b to 48e on the tape 31a from the position of the DF image data D2 by the write sections 46b to 46e in accordance with the write commands s11 to s14 from the controller 5a. When the tape 31a travels along a direction C indicated by an arrow, operation data of the respective operation data of the respective languages are written on the audio tracks 48b to 48e as audio data.

When the audio data and the image data are recorded on the tape 31a as described above, the audio data corresponding to the position of the DF image data D2 are SA1 to SE1. That is, the audio data SA2 to SE2 necessary for the DF image data D2 do not correspond to the position of the DF image data D2.

The operator uses an editor (not shown) to edit the audio data in the audio tracks 48b to 48e so that the audio data SA2 to SE2 necessary for the DF image data D2 are caused to correspond to the position of the DF image data D2, as shown in FIG. 11.

The image data are sequentially read out from the DF image data D1 in units of diagnosis portions by a read section 37a. At the same time, of all the edited audio data, for example, the Japanese case data is read out. That is, the read command s21 is supplied from the controller 5a to the read section 50b, and the switching command s25 is supplied from the controller 5a to the switch SW3. The audio data SB1 and SB2 as the Japanese case data are read from the audio track 48b by the read section 50b. The readout case data are amplified by the amplifier 54 through the terminals b3 and f3. The Japanese case data is output from the loudspeaker 56 as a sound. Therefore, the audio data SB1 necessary for the DF image data D1 can be reproduced during reproduction of the DF image data D1 and the DR display image data S1.

The DF display image data S can be observed, the DF image data D can be searched, and case data necessary for the DF image data D can be obtained as a voice output. As a result, effective diagnosis information can be provided, and diagnosis efficiency can be improved. In the above embodiment, Japanese case information is reproduced. However, it is easy to reproduce other pieces of case information by the above procedures. In this embodiment, X-ray diagnosis information is recorded as audio data. However, any other information may be recorded. In addition, the number of audio data need not be limited to five, but may be an arbitrary number.

Various changes and modifications may be made without departing from the spirit and scope of the invention.

Additional advantages and modifications will readily occur to those skilled in the art. Therefore, the invention in its broader aspects is not limited to the specific details, and representative devices, shown and described. Accordingly, various modifications may be made without departing from the spirit or scope of the general inventive concept as defined by the appended claims and their equivalents.

What is claimed is:

1. An image recording apparatus for connection between an image signal source providing an image signal of a first format characterized by a plurality of video frames, with each of the frames having a first predetermined number of pixels in a vertical direction, a second predetermined number of pixels in a horizontal direction and a third predetermined number of bits of pixel data, and a video tape recorder capable of variable speed reproduction of the image signal of a modified first format characterized by a plurality of video frames, with each of the frames having the first predetermined number of pixels in a vertical direction, the second predetermined number of pixels in a horizontal direction and a fourth predetermined number of bits of pixel data, the fourth predetermined number being smaller than the third predetermined number, the apparatus comprising:

gradation means for modifying the image signal of the first format provided by the image signal source by reducing the number of bits of the pixel data of the image signal to provide the image signal of the modified first format;

means for converting the image signal of the first format provided by the image signal source into an image signal of a second format, the video tape recorder being incapable of variable speed reproduction of the image signal of the second format; and means for supplying the image signal of the modified first format output from said gradation means and the image signal of the second format output from said converting means to said video tape recorder, the image signal of the modified first format and the image signal of the second format being recorded on a video tape in a predetermined relationship to allow for searching of the image signal of the second format by reproducing the image signal of the modified first format in variable speed by the video tape recorder.

2. An apparatus according to claim 1, wherein said supplying means includes switching means for supplying to said video tape recorder a predetermined number of frames of the image signal of the second format alternately with a predetermined number of frames of the image signal of the modified first format output from said gradation means.

3. An apparatus according to claim 1, wherein said image source comprises a digital fluorographic apparatus for providing a digital subtraction angiogram image signal.

4. An apparatus according to claim 3, further including sound input means for supplying an audio signal representing diagnostic information to said video tape recorder, the audio signal, the image signal of the modified first format output from said gradation means and the image signal of the second format being recorded by the video tape recorder at predetermined corresponding positions on the video tape.

5. An apparatus according to claim 1, wherein said converting means comprises:

means for compressing the image signal of the first format by deleting a part of the image signal;

means for dividing the compressed image signal of the first format into plural blocks each formed of i (a positive integer) pixels $\times$ j (a positive integer and not equal to i) bits; and means for converting each block of i pixels $\times$ j bits to a block of j pixels $\times$ i bits, the block of j pixels $\times$ i bits forming the image signal of the second format.

6. An apparatus according to claim 5, wherein said compressing means comprises means for compressing the image signal of the first format such that the amount of the compressed image signal substantially equals the amount of the image signal of the modified first format.

7. An apparatus according to claim 1, wherein said supplying means comprises means for adding a flag indicating whether the image signal is of the modified first format or of the second format to the image signal supplied to said video tape recorder from said converting means.

* * * * *

UNITED STATES PATENT AND TRADEMARK OFFICE
CERTIFICATE OF CORRECTION

PATENT NO. : 5,434,674
DATED : July 18, 1995
INVENTOR(S) : Ikuji MASUDA

It is certified that error appears in the above-indentified patent and that said Letters Patent is hereby corrected as shown below:

In the Abstract

Line 1, "format;" should read --format,--.

Line 3, after "frames", insert --,--.

Lines 9 and 11, after "is", insert --also--.

Line 13, delete "then"; "reproduction" should read --playback--.

Signed and Sealed this

Second Day of July, 1996

Attest:

BRUCE LEHMAN

*Attesting Officer*  *Commissioner of Patents and Trademarks*